US012594721B2

(12) United States Patent　　　(10) Patent No.:　US 12,594,721 B2
Sterle et al.　　　　　　　　　　(45) Date of Patent:　　　Apr. 7, 2026

(54) BUILD MATERIAL ESCAPEMENT ASSEMBLY AND ADDITIVE MANUFACTURING SYSTEMS INCLUDING SAME

(71) Applicant: General Electric Company, Schenectady, NY (US)

(72) Inventors: John Sterle, Clifton Park, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 181 days.

(21) Appl. No.: 18/236,114

(22) Filed: Aug. 21, 2023

(65) Prior Publication Data

US 2024/0157643 A1　　　May 16, 2024

Related U.S. Application Data

(60) Provisional application No. 63/424,600, filed on Nov. 11, 2022.

(51) Int. Cl.
　　*B29C 64/307*　　　(2017.01)
　　*B29C 64/214*　　　(2017.01)
　　　　　　(Continued)

(52) U.S. Cl.
　　CPC .......... *B29C 64/307* (2017.08); *B29C 64/214* (2017.08); *B33Y 10/00* (2014.12); *B33Y 30/00* (2014.12); *B33Y 40/00* (2014.12)

(58) Field of Classification Search
　　CPC ..... B29C 64/35; B29C 64/124; B29C 64/129; B29C 64/135; B29C 64/153;
　　　　　　(Continued)

(56) References Cited

U.S. PATENT DOCUMENTS 8,017,055 B2　　9/2011　Davidson et al.
11,014,296 B2　　5/2021　De Pena et al.
　　　　　　(Continued)

FOREIGN PATENT DOCUMENTS

WO　　　199534468 A1　12/1995
WO　　WO-9534468 A1 * 12/1995　........... B29C 64/357
　　　　　　(Continued)

OTHER PUBLICATIONS

Extended European Search Report for Application No. 23208442.6 dated Mar. 6, 2024 (8 pages).

*Primary Examiner* — Ariella Machness
(74) *Attorney, Agent, or Firm* — Dinsmore & Shohl LLP

(57)　　　　　　ABSTRACT

A build material escapement assembly for an additive manufacturing system includes a retaining plate for coupling the build material escapement assembly to the additive manufacturing system. A base having a plurality of ports is disposed beneath the retaining plate, and a support frame is disposed within the base. A diaphragm is disposed around the base, and a retractable plate is disposed between the support frame and the diaphragm. A top plate is further coupled to the retractable plate through the diaphragm and a plurality of connectors are coupled to the plurality of ports of the base. The base, support frame, diaphragm, retractable plate, and top plate define a cavity, and the top plate is movable between a retracted position by applying a negative pressure and an extended position by applying positive pressure to the cavity via the plurality of connectors.

17 Claims, 9 Drawing Sheets

(51) Int. Cl.
     *B33Y 30/00*          (2015.01)
     *B33Y 40/00*          (2020.01)
     *B33Y 10/00*          (2015.01)

(58) Field of Classification Search
     CPC ... B29C 64/165; B29C 64/245; B29C 64/307;
                 B29C 64/357; B22F 10/70; B22F 10/73
     See application file for complete search history.

(56)                    References Cited

U.S. PATENT DOCUMENTS

| | | |
|---|---|---|
| 11,396,135 B2 | 7/2022 | Mamrak et al. |
| 2008/0241404 A1 | 10/2008 | Allaman et al. |
| 2017/0120521 A1 | 5/2017 | Sakura et al. |
| 2017/0120538 A1 | 5/2017 | Demuth et al. |
| 2019/0224782 A1 | 7/2019 | Hofmann et al. |
| 2020/0376551 A1 | 12/2020 | Morganson |
| 2021/0206094 A1* | 7/2021 | Schmale ................ B33Y 30/00 |
| 2023/0347417 A1* | 11/2023 | Okazaki ................ B29C 64/214 |

FOREIGN PATENT DOCUMENTS

| | | |
|---|---|---|
| WO | 2020237143 A1 | 11/2020 |
| WO | 2022086868 A1 | 4/2022 |

* cited by examiner

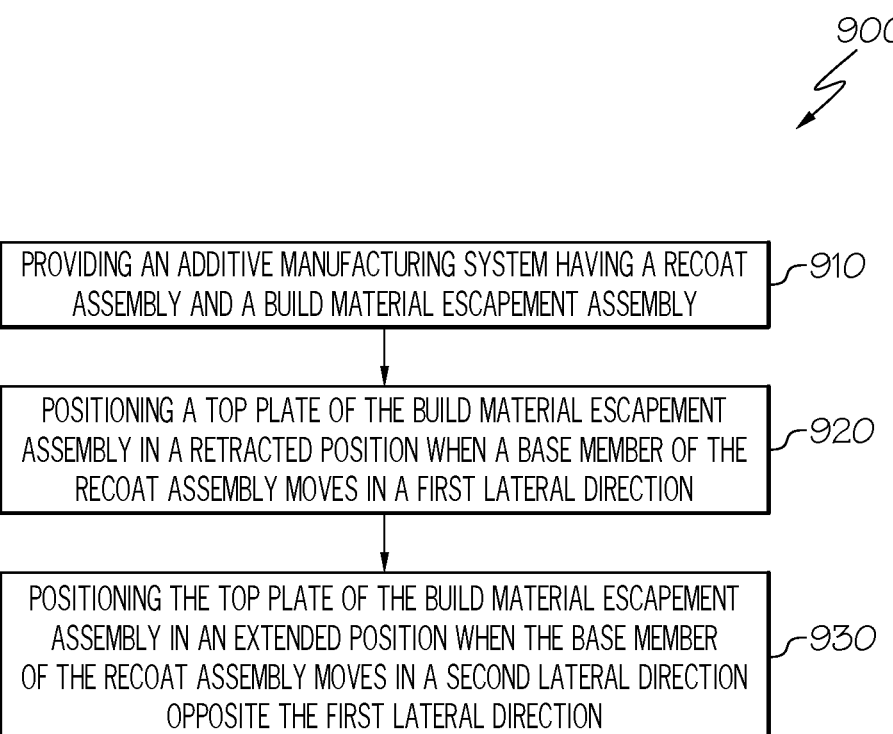

900

| PROVIDING AN ADDITIVE MANUFACTURING SYSTEM HAVING A RECOAT ASSEMBLY AND A BUILD MATERIAL ESCAPEMENT ASSEMBLY | 910 |

| POSITIONING A TOP PLATE OF THE BUILD MATERIAL ESCAPEMENT ASSEMBLY IN A RETRACTED POSITION WHEN A BASE MEMBER OF THE RECOAT ASSEMBLY MOVES IN A FIRST LATERAL DIRECTION | 920 |

| POSITIONING THE TOP PLATE OF THE BUILD MATERIAL ESCAPEMENT ASSEMBLY IN AN EXTENDED POSITION WHEN THE BASE MEMBER OF THE RECOAT ASSEMBLY MOVES IN A SECOND LATERAL DIRECTION OPPOSITE THE FIRST LATERAL DIRECTION | 930 |

FIG. 9

BUILD MATERIAL ESCAPEMENT ASSEMBLY AND ADDITIVE MANUFACTURING SYSTEMS INCLUDING SAME

CROSS REFERENCE TO RELATED APPLICATION

This application claims the benefit of U.S. Provisional Patent Application No. 63/424,600, filed Nov. 11, 2022, for "Build Material Escapement Assembly and Additive Manufacturing Systems Including Same," which is hereby incorporated by reference in its entirety including the drawings.

TECHNICAL FIELD

The present specification generally relates to additive manufacturing systems and, more specifically, to build material escapements of additive manufacturing systems for maintaining uniform build layers.

BACKGROUND

Additive manufacturing systems may be utilized to "build" an object from build material, such as organic or inorganic powders, in a layer-wise manner. Conventional additive manufacturing systems include various "recoat" apparatuses that are configured to sequentially distribute layers of build material, such that a binder material can be deposited and cured to "build" an object. However, conventional recoat apparatuses may inconsistently distribute build material, leading to variation in the objects built by the additive manufacturing system. More particularly, the inconsistent distribution of build material may result in regions of excess build material being formed near the perimeter of a build area on which the build material is distributed. Accordingly, a need exists for a means of managing excess build material that is accumulated during the distribution process and ensuring that build material is accurately and consistently distributed during additive manufacturing processes.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9 schematically depicts an illustrative view of a flow diagram of a method for managing excess build material during an additive manufacturing process, according to one or more embodiments shown and described herein.

DETAILED DESCRIPTION

Figure 1:
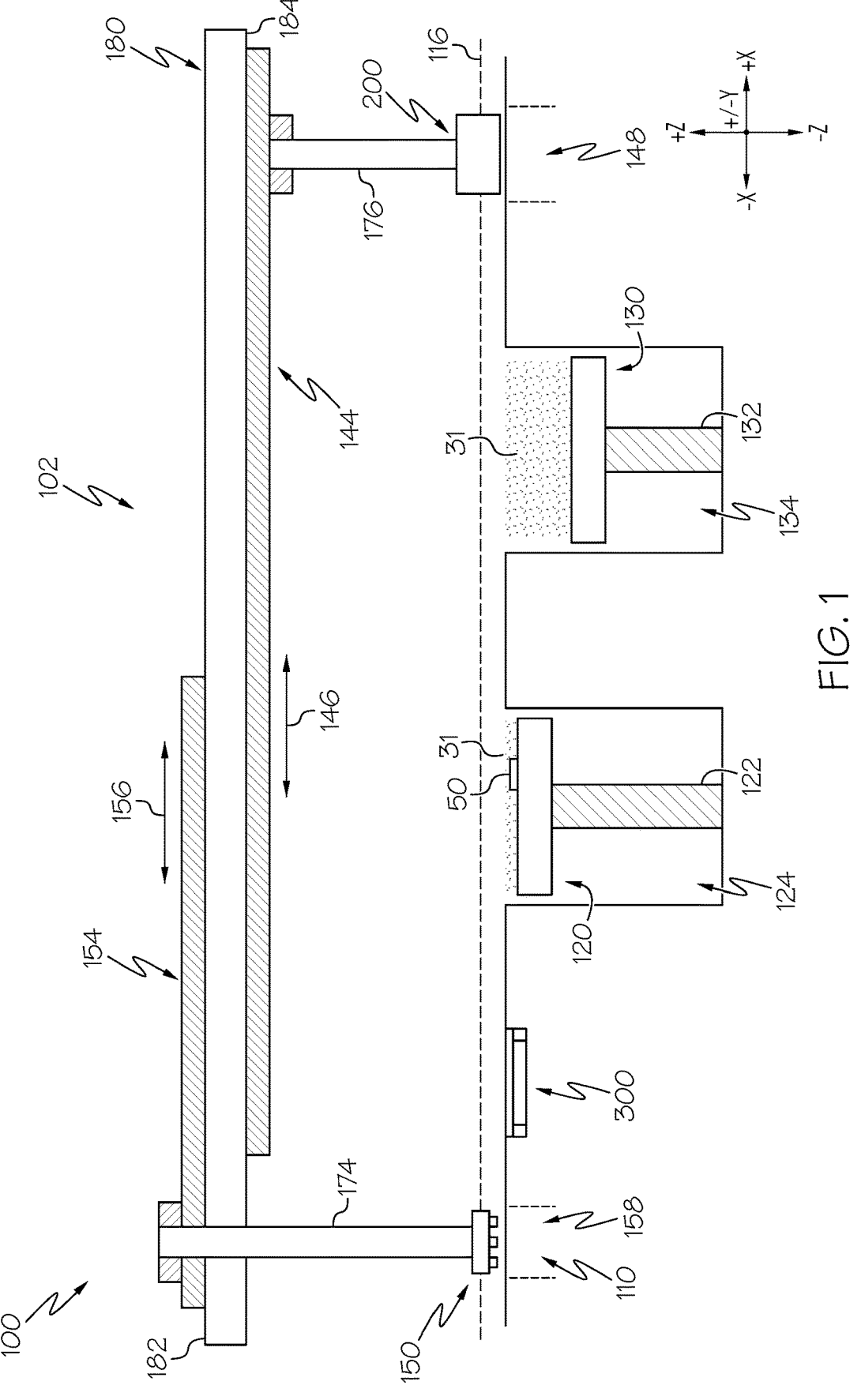
FIG. 1 schematically depicts an additive manufacturing system, according to one or more embodiments shown and described herein.

Embodiments described herein are directed to build material escapement assemblies for an additive manufacturing system. The build material escapement assemblies may include a retaining plate for coupling the build material escapement assembly to the additive manufacturing system. A base having a plurality of ports is disposed beneath the retaining plate, and a support frame is disposed within the base. A diaphragm is disposed around an outer perimeter of the base, and a retractable plate is disposed between the support frame and the diaphragm. A top plate is further coupled to the retractable plate through the diaphragm and a plurality of connectors are coupled to the plurality of ports of the base. The base, support frame, diaphragm, retractable plate, and top plate define a cavity, and the top plate is movable between a retracted position by applying a negative pressure and an extended position by applying positive pressure to the cavity via the plurality of connectors. Various embodiments of the build material escapement assemblies and additive manufacturing systems, and the operation of the build material escapement assemblies and additive manufacturing systems are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Embodiments described herein are generally directed to build material escapement assemblies for additive manufacturing systems. Additive manufacturing systems may generally "build" materials through successive deposition and binding of build material. In conventional additive manufacturing systems, deposition of build material is a difficult, dirty, time-consuming, and error-prone process. Furthermore, conventional additive manufacturing systems may struggle to evenly distribute build material across a build area, which may result in excess build material accumulating at the edges of the build area. Embodiments described herein are directed to build material escapement assemblies that receive excess build material and resupply the build material to the additive manufacturing system in a consistent and configurable manner.

Referring now to FIG. 1, an embodiment of an additive manufacturing system 100 is schematically depicted. The additive manufacturing system 100 includes a cleaning station 110, a build area 124, a supply platform 130, an actuator assembly 102, and a build material escapement assembly 300. The actuator assembly 102 comprises, among other elements, a recoat assembly 200 for distributing build material 31 and a print head 150 for depositing binder material 50. The actuator assembly 102 is constructed to facilitate traversing the recoat assembly 200 and the print head 150 over a working axis 116 of the additive manufacturing system 100 independent of one another. This allows for at least some steps of the additive manufacturing process to be performed simultaneously thereby reducing the overall cycle time of the additive manufacturing process to less than the sum of the cycle time for each individual step. In the embodiments of the additive manufacturing system 100 described herein, the working axis 116 of the additive manufacturing system 100 is parallel to the +/−X axis of the coordinate axes depicted in the figures. It should be understood that the components of the additive manufacturing system 100 traversing the working axis 116, such as the print head 150, the recoat assembly 200, and the like, need not be centered on the working axis 116. However, in the embodiments described herein, at least two of the components of the additive manufacturing system 100 are arranged with respect to the working axis 116 such that, as the components traverse the working axis 116, the components could occupy the same or an overlapping volume along the working axis 116 if not properly controlled.

In the embodiments described herein, the cleaning station 110, the build platform 120, the supply platform 130, and the build material escapement assembly 300 are positioned in series along the working axis 116 of the additive manufacturing system 100 between a print home position 158 of the print head 150 located proximate an end of the working axis 116 in the −X direction, and a recoat home position 148 of the recoat assembly 200 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build area 124, the supply platform 130, and the build material escapement assembly 300 are positioned therebetween. In the embodiments described herein, the build area 124 is positioned between the build material escapement assembly 300 and the supply platform 130 along the working axis 116 of the additive manufacturing system 100.

The cleaning station 110 is positioned proximate one end of the working axis 116 of the additive manufacturing system 100 and is co-located with the print home position 158 where the print head 150 is located or "parked" before and after depositing binder material 50 on a layer of build material 31 positioned on the build area 124. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material 50 on the print head 150, a wiping station for removing excess binder material 50 from the print head 150, a jetting station for purging binder material 50 and cleaning solution from the print head 150, a park station for maintaining moisture in the nozzles of the print head 150, or various combinations thereof. The print head 150 may be transitioned between the cleaning sections by the actuator assembly 102.

While reference is made herein to additive manufacturing systems including a print head 150 that dispenses a binder material 50, it should be understood that recoat assemblies 200 described herein may be utilized with other suitable additive powder-based additive manufacturing systems. For example, in some embodiments, instead of building objects with a cured binder material 50 applied to build material 31, in some embodiments, a laser or other energy source may be applied to the build material 31 to fuse the build material 31.

In the embodiment depicted in FIG. 1, the build area 124 comprises a receptacle including a build platform 120. The build platform 120 is coupled to a build platform actuator 122 to facilitate raising and lowering the build platform 120 relative to the working axis 116 of the additive manufacturing system 100 in a vertical direction (i.e., a direction parallel to the +/−Z axis of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build area 124 located below the working axis 116 (i.e., in the −Z direction of the coordinate axes depicted in the figures) of the additive manufacturing system 100. During operation of the additive manufacturing system 100, the build platform 120 is retracted into the build area 124 by action of the build platform actuator 122 after each layer of binder material 50 is deposited on the build material 31 located on build platform 120. While the build area 124 described and depicted herein includes a receptacle, it should be understood that the build area 124 may include any suitable structure for supporting build material 31, and may for example include a mere surface supporting the build material 31.

The supply platform 130 is coupled to a supply platform actuator 132 to facilitate raising and lowering the supply platform 130 relative to the working axis 116 of the additive manufacturing system 100 in a vertical direction (i.e., a direction parallel to the +/−Z axis of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in the vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the additive manufacturing system 100. During operation of the additive manufacturing system 100, the supply platform 130 is raised relative to the supply receptacle 134 and towards the working axis 116 of the additive manufacturing system 100 by action of the supply platform actuator 132 after a layer of build material 31 is distributed from the supply platform 130 to the build platform 120.

In embodiments, the actuator assembly 102 generally includes a recoat assembly transverse actuator 144, a print head actuator 154, a first guide 182, and a second guide 184. The recoat assembly transverse actuator 144 is operably coupled to the recoat assembly 200 and is operable to move the recoat assembly 200 relative to the build platform 120 to dispense build material 31 on the build platform 120. The print head actuator 154 is operably coupled to the print head 150 and is operable to move the print head 150 and is operable to move the print head 150 relative to the build platform 120 to dispense the binder material 50 on the build platform 120.

In the embodiments described herein, the first guide 182 and the second guide 184 extend in a horizontal direction (i.e., a direction parallel to the +/−X axis of the coordinate axes depicted in the figures) parallel to the working axis 116 of the additive manufacturing system 100 and are spaced apart from one another in the vertical direction. When the actuator assembly 102 is positioned over the cleaning station 110, the build platform 120, the supply platform 130, and the build material escapement assembly 300, as depicted in FIG. 1, the first guide 182 and the second guide 184 extend in a horizontal direction from at least the cleaning station 110 to beyond the supply platform 130.

In the embodiment of the actuator assembly 102 depicted in FIG. 1, the first guide 182 and the second guide 184 are opposite sides of a rail 180 that extends in a horizontal direction and is oriented such that the first guide 182 is positioned above and spaced apart from the second guide 184. For example, in one embodiment, the rail 180 has an "I" configuration in vertical cross section (i.e., a cross section in the Y-Z plane of the coordinate axes depicted in the figures) with upper and lower flanges of the "I" forming the first guide 182 and the second guide 184, respectively. However, it should be understood that other embodiments are contemplated and possible. For example and without limitation, the first guide 182 and the second guide 184 may be separate structures, such as separate rails, extending in the horizontal direction and spaced apart from one another in the vertical direction. In some embodiments, the first guide 182 and the second guide 184 may be positioned at the same height and spaced apart from one another on opposite sides of the rail 180. In embodiments, the first guide 182 and the second guide 184 are positioned in any suitable configuration, and may be collinear.

In the embodiments described herein, the recoat assembly transverse actuator 144 is coupled to one of the first guide 182 and the second guide 184, and the print head actuator 154 is coupled to the other of the first guide 182 and the second guide 184 such that the recoat assembly transverse actuator 144 and the print head actuator 154 are arranged in a "stacked" configuration. For example, in the embodiment of the actuator assembly 102 depicted in FIG. 1, the recoat assembly transverse actuator 144 is coupled to the second guide 184 and the print head actuator 154 is coupled to the first guide 182. However, it should be understood that, in other embodiments, the recoat assembly transverse actuator 144 may be coupled to the first guide 182 and the print head actuator 154 may be coupled to the second guide 184.

In the embodiments described herein, the recoat assembly transverse actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat assembly transverse actuator 144 and the print head actuator 154 are actuatable, respectively. The recoat motion axis 146 and the print motion axis 156 extend in a horizontal direction and are parallel with the working axis 116 of the additive manufacturing system 100. In the embodiments described herein, the recoat motion axis 146 and the print motion axis 156 are parallel with one another and spaced apart from one another in the vertical direction due to the stacked configuration of the recoat assembly transverse actuator 144 and the print head actuator 154. In some embodiments, such as the embodiment of the actuator assembly 102 depicted in FIG. 1, the recoat motion axis 146 and the print motion axis 156 are located in the same vertical plane (i.e., a plane parallel to the X-Z plane of the coordinate axes depicted in the figures). However, it should be understood that other embodiments are contemplated and possible, such as embodiments in which the recoat motion axis 146 and the print motion axis 156 are located in different vertical planes.

In the embodiments described herein, the recoat assembly transverse actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat assembly transverse actuator 144 and the print head actuator 154 are linear actuators manufactured by Aerotech® Inc. of Pittsburgh, Pennsylvania, such as the PRO225LM Mechanical Bearing, Linear Motor Stage.

In embodiments, the recoat assembly transverse actuator 144 and the print head actuator 154 may each be a cohesive sub-system that is affixed to the rail 180, such as when the recoat assembly transverse actuator 144 and the print head actuator 154 are PRO225LM Mechanical Bearing, Linear Motor Stages, for example. However, it should be understood that other embodiments are contemplated and possible, such as embodiments where the recoat assembly transverse actuator 144 and the print head actuator 154 comprise multiple components that are individually assembled onto the rail 180 to form the recoat assembly transverse actuator 144 and the print head actuator 154, respectively.

Still referring to FIG. 1, the recoat assembly 200 is coupled to the recoat assembly transverse actuator 144 such that the recoat assembly 200 is positioned below (i.e., in the −Z direction of the coordinate axes depicted in the figures) the first guide 182 and the second guide 184. When the actuator assembly 102 is positioned over the cleaning station 110, the build platform 120, the supply platform 130, and the build material escapement assembly 300, as depicted in FIG. 1, the recoat assembly 200 is situated on the working axis 116 of the additive manufacturing system 100. Thus, bi-directional actuation of the recoat assembly transverse actuator 144 along the recoat motion axis 146 affects bi-directional motion of the recoat assembly 200 on the working axis 116 of the additive manufacturing system 100. In the embodiment of the actuator assembly 102 depicted in FIG. 1, the recoat assembly 200 is coupled to the recoat assembly transverse actuator 144 with a support bracket 176 such that the recoat assembly 200 is positioned on the working axis 116 of the additive manufacturing system 100 while still providing clearance between rail 180 of the actuator assembly 102 and the build platform 120, the supply platform 130, and the build material escapement assembly 300. In some embodiments described herein, the recoat assembly 200 may be fixed in directions orthogonal to the recoat motion axis 146 and the working axis 116 (i.e., fixed along the +/−Z axis and/or fixed along the +/−Y axis).

Similarly, the print head 150 is coupled to the print head actuator 154 such that the print head 150 is positioned below (e.g., in the −Z direction of the coordinate axes depicted in the figures) the first guide 182 and the second guide 184. When the actuator assembly 102 is positioned over the cleaning station 110, the build platform 120, the supply platform 130, and the build material escapement assembly 300, as depicted in FIG. 1, the print head 150 is situated on the working axis 116 of the additive manufacturing system 100. Thus, bi-directional actuation of the print head actuator 154 along the print motion axis 156 affects bi-directional motion of the print head 150 on the working axis 116 of the additive manufacturing system 100. In the embodiment of the actuator assembly 102 depicted in FIG. 1, the print head 150 is coupled to the print head actuator 154 with a support bracket 174 such that the print head 150 is positioned on the working axis 116 of the additive manufacturing system 100 while still providing clearance between rail 180 of the actuator assembly 102 and the build platform 120, the supply platform 130, and the build material escapement assembly 300. In some embodiments described herein, the print head 150 may be fixed in directions orthogonal to the print motion axis 156 and the working axis 116 (i.e., fixed along the +/−Z axis and/or fixed along the +/−Y axis).

While FIG. 1 schematically depicts an embodiment of an actuator assembly 102 which comprises a first guide 182 and a second guide 184 with the recoat assembly transverse actuator 144 and the print head actuator 154 mounted thereto, respectively, it should be understood that other embodiments are contemplated and possible, such as embodiments which comprise more than two guides and more than two actuators. It should also be understood that other embodiments are contemplated and possible, such as embodiments which comprise the print head 150 and the recoat assembly 200 on the same actuator.

Figure 2A:
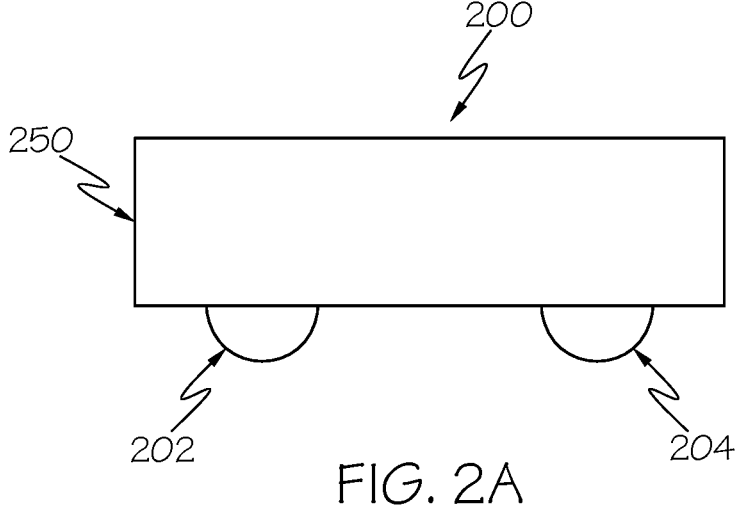
FIG. 2A schematically depicts a recoat assembly of the additive manufacturing system of FIG. 1, according to one or more embodiments shown and described herein.
Figure 2B:
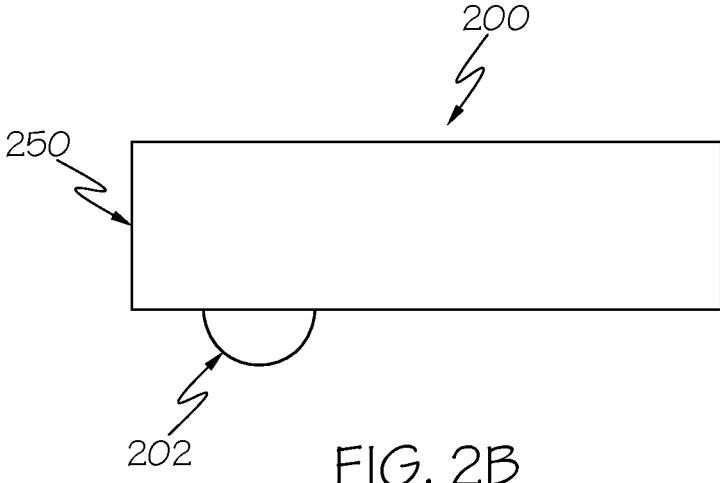
FIG. 2B schematically depicts an alternate embodiment of the recoat assembly of FIG. 2A, according to one or more embodiments shown and described herein.

Referring now to FIGS. 2A and 2B, in some embodiments, the recoat assembly 200 includes a base member 250 coupled to the recoat assembly transverse actuator 144 (FIG. 1), which moves the base member 250 in the lateral direction (i.e., in the +/−X axis). As referred to herein, the base member 250 may include any suitable structure of the recoat assembly 200 coupled to the recoat assembly transverse actuator 144, and may include a housing, a plate, or the like.

The recoat assembly 200 includes a build material 31 spreading member, such as a powder spreading member. In embodiments, the powder spreading member includes rollers 202, 204. In embodiments, the second roller 204 is positioned rearward of the first roller 202 (i.e., in the −X direction as depicted). In these embodiments, the first roller 202 may generally be referred to as the "front" roller, and the second roller 204 may be referred to as the "rear" roller. Furthermore, it should be understood that although FIG. 2A depicts the recoat base member 250 as including first roller 202 and second roller 204, the recoat assembly 200 may include only a single roller 202 without departing from the scope of the present disclosure, as is illustrated in FIG. 2B.

Although not shown, it should be appreciated that, in some embodiments, the recoat assembly 200 further includes a first rotational actuator coupled to the first roller 202, and a second rotational actuator coupled to the second roller 204. In some embodiments, the first rotational actuator and the second rotational actuator are spaced apart from and coupled to the first roller 202 and the second roller 204, respectively, through a belt, a chain, or the like. In some embodiments, the recoat assembly 200 may include a single rotational actuator coupled to both the first roller 202 and the second roller 204. The first rotational actuator is configured to rotate the first roller 202 about a first rotation axis and the second rotational actuator is configured to rotate the second roller 204 about a second rotation axis. The first rotation axis and the second rotation axis are generally parallel to one another and are spaced apart from one another in the +/−X axis. The first roller 202 and the second roller 204 may be rotated in a "rotation direction" (e.g., a clockwise direction from the perspective shown in FIG. 2A) and/or a "counter-rotation direction" that is the opposite of the rotation direction (e.g., a counter-clockwise direction from the perspective shown in FIG. 2A). The first roller 202 and the second roller 204 can be rotated in the same direction or may be rotated in opposite directions from one another. The first rotational actuator and the second rotational actuator may include any suitable actuator for inducing rotation of the first roller 202 and the second roller 204, such as and without limitation, alternating current (AC) or direct current (DC) brushless motors, linear motors, servo motors, stepper motors, pneumatic actuators, hydraulic actuators, or the like.

In these embodiments, the rollers 202, 204 may be rotatably fixed within the recoat base member 250, such that the rollers 202, 204 may move in tandem with the recoat base member 250 as the recoat base member 250 is actuated. As such, the rollers 202, 204 may rotate in the rotation and counter-rotation direction, as has been described herein, and may translate with the recoat base member 250, but may not move in any orthogonal direction (e.g., in the +/−Y or +/−Z direction, as depicted in the coordinate axis of FIGS. 2A and 2B).

Figure 3:
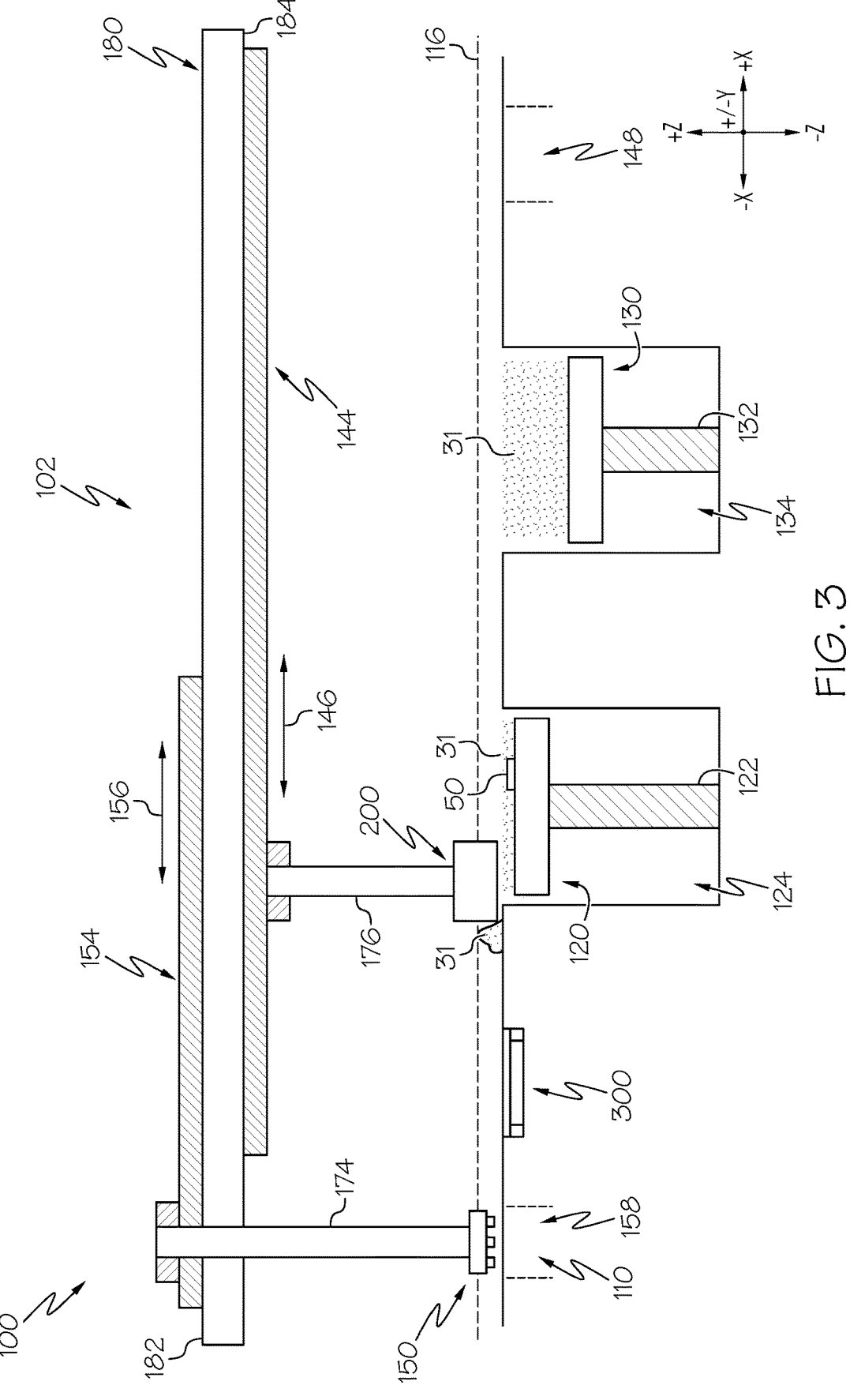
FIG. 3 schematically depicts the additive manufacturing machine of FIG. 1 during a forward recoat of a build material distribution process, according to one or more embodiments shown and described herein.

In operation, the recoat assembly 200 may move across the build area 124 in the −X direction, as depicted in FIG. 3, to perform a forward recoat (e.g., a recoat that distributes build material 31 from the supply platform 130 to the build area 124). In these embodiments, the first roller 202 and the second roller 204 may rotate in the counter-rotation direction, such that build material 31 is distributed from the supply platform 130 and onto the build platform 120 as the recoat assembly 200 performs the forward recoat.

As further depicted in FIG. 3, the movement of the recoat assembly 200 across the build area 124 during the forward recoat may cause excess build material 31 to collect outside the area of the build platform 120. As has been discussed herein, the collection of excess build material 31 may result in an uneven distribution of the build material 31 on the build platform 120, which may cause irregularities and inefficiencies in the objects formed during an additive manufacturing process.

Figure 4:
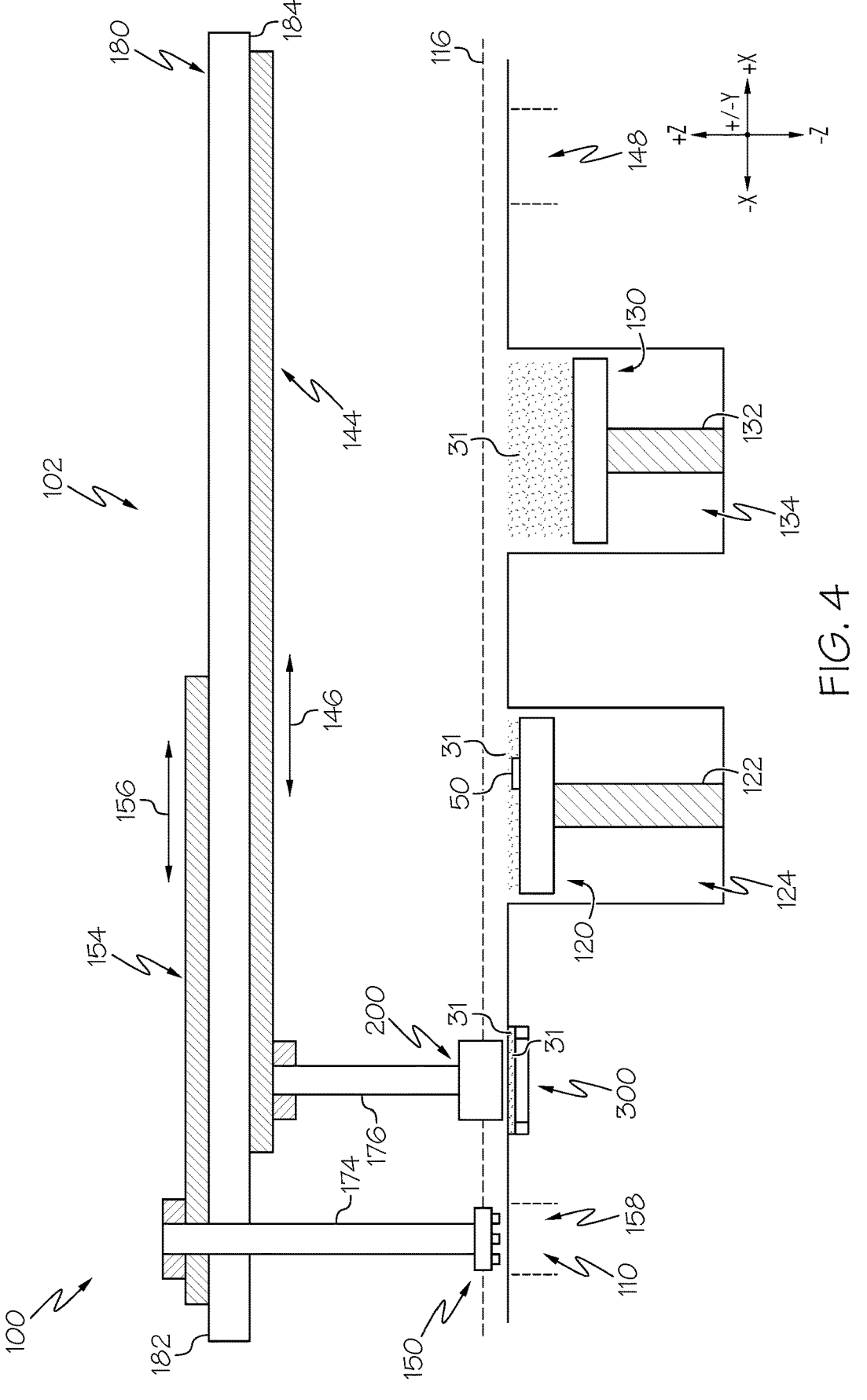
FIG. 4 schematically depicts the additive manufacturing assembly of FIG. 1 providing excess build material into a build material escapement assembly, according to one or more embodiments shown and described herein.

In order to evenly distribute the collection of excess build material 31, the recoat assembly 200 may continue to move in the –X direction such that the recoat assembly 200 forces the build material 31 into the build material escapement assembly 300, as is depicted in FIG. 4. In these embodiments, the build material escapement assembly 300 may receive the excess build material 31 in a cavity when the recoat assembly 200 performs the forward recoat. When the recoat assembly 200 prepares to perform a return recoat (e.g., moving the recoat assembly 200 in the –X direction as depicted in the coordinate axis of FIG. 3 towards the recoat home position 148) the build material escapement assembly 300 may be actuated to present the excess build material 31 to the recoat assembly 200, such that the recoat assembly 200 may distribute the excess build material 31 across the build platform 120 during the return recoat. The build material escapement assembly 300 will be described in additional detail herein, with reference to the relevant drawings.

Figure 5:
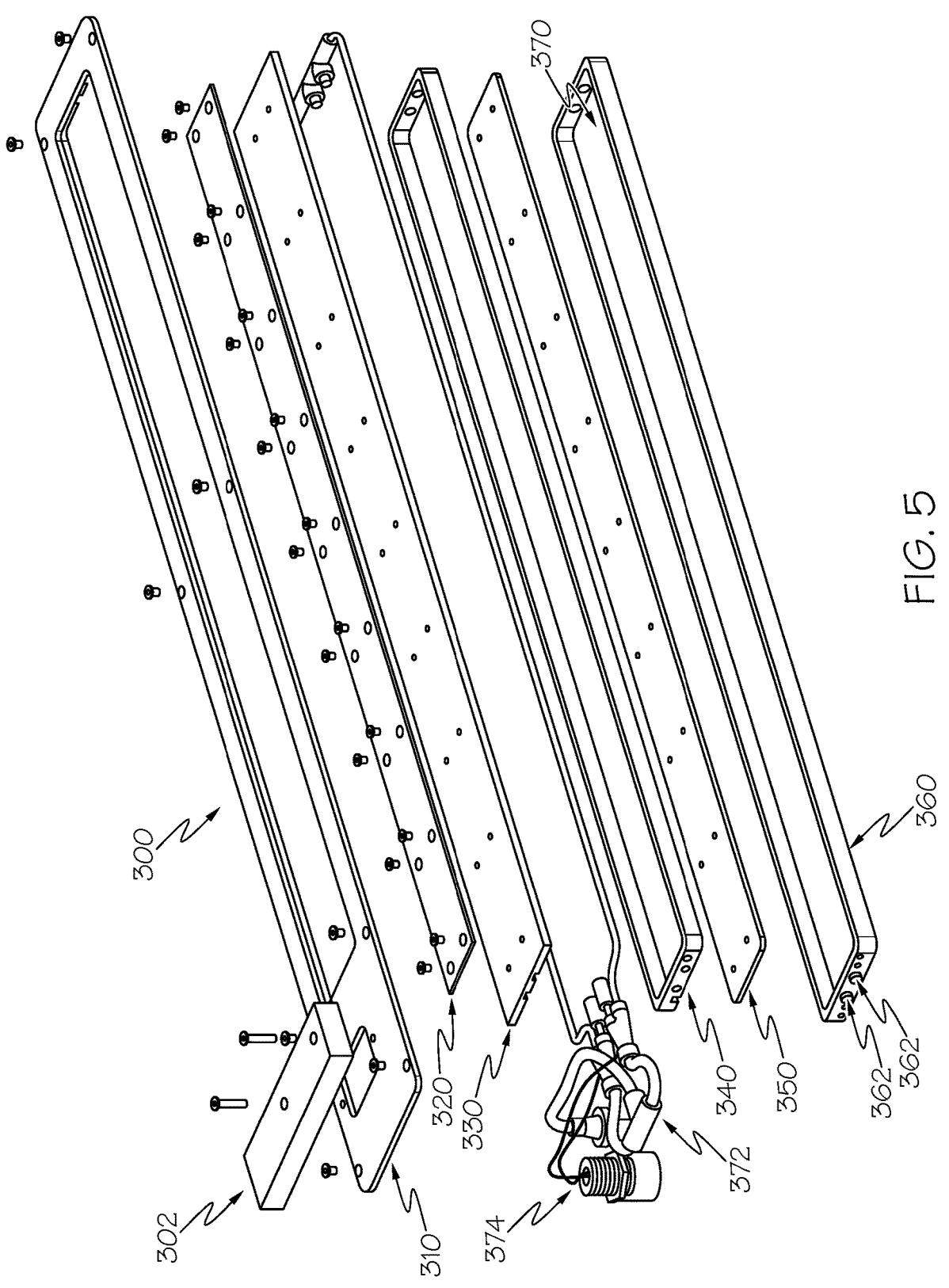
FIG. 5 schematically depicts an exploded view of the build material escapement assembly of FIG. 3, according to one or more embodiments shown and described herein FIG. 6 schematically depicts a front side view of a build material escapement assembly of FIG. 1, according to one or more embodiments shown and described herein.
Figure 6:
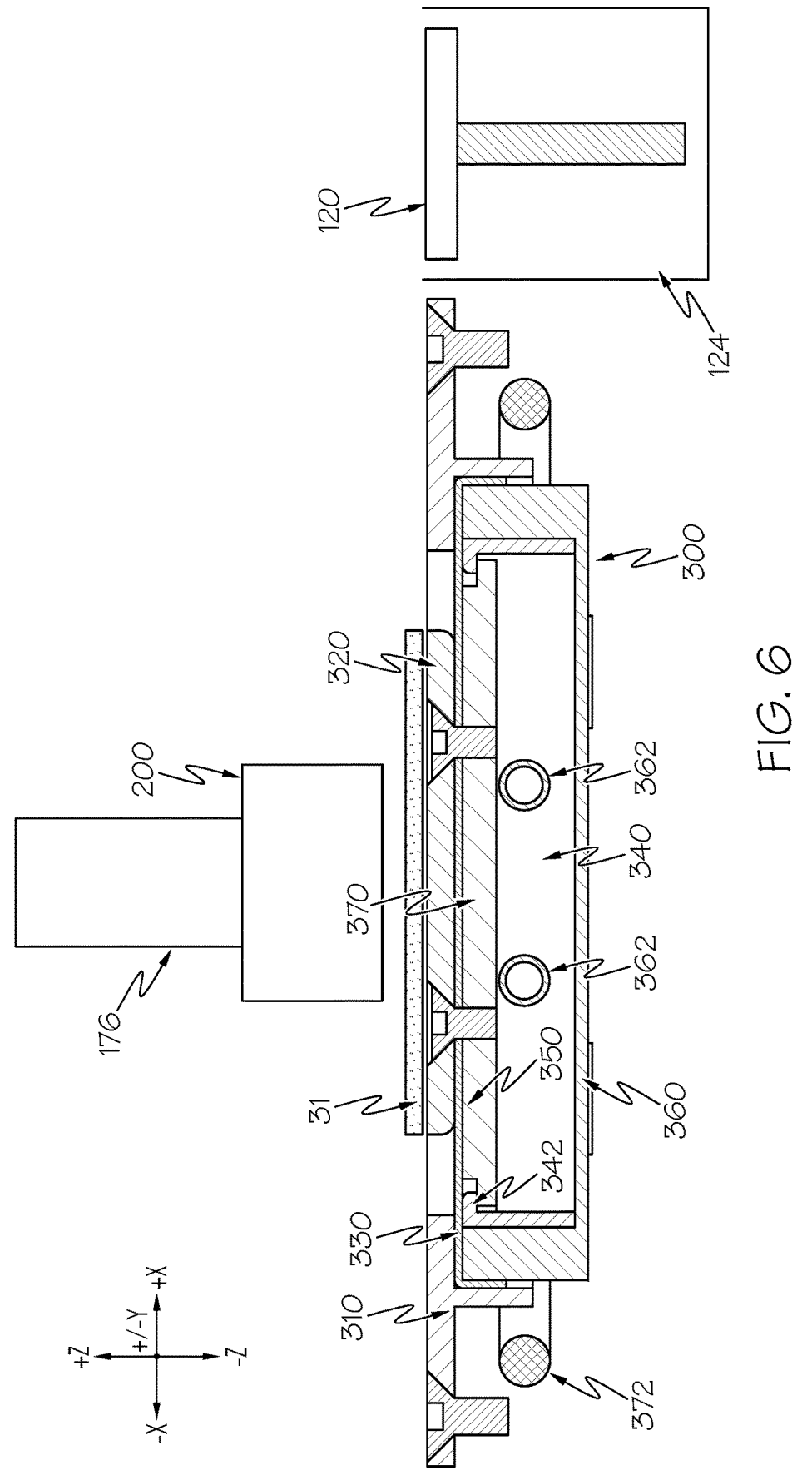

Referring now to FIGS. 5 and 6, the build material escapement assembly 300 is depicted. As illustrated in FIGS. 5 and 6, the build material escapement assembly 300 may include a retaining plate 310, a top plate 320, a diaphragm 330, a support frame 340, a retractable plate 350, and a base 360. As most clearly depicted in FIG. 6, the retaining plate 310 may lie flush with a surface of the build area 124, such that the recoat assembly 200 may push excess build material 31 onto the top plate 320 of the build material escapement assembly 300. In these embodiments, the retaining plate 310 may further define an opening, such as a central opening, in which the top plate 320 is received.

Referring still to FIGS. 5 and 6, the top plate 320, the diaphragm 330, the support frame 340, the retractable plate 350, and the base 360 may define a cavity 370, such as a gas cavity. In these embodiments, the top plate 320, the diaphragm 330, and the retractable plate 350 may be fixedly coupled, such that each of the aforementioned components may be moved together simultaneously. For example, the top plate 320, the diaphragm 330 and the retractable plate 350 may be fixedly coupled via a plurality of fasteners (e.g., pins, screws, bolts, etc.). Furthermore, an adhesive may be used to bond the diaphragm 330 to the base 360 to form a fluid-tight seal between the diaphragm 330 and the base 360, thereby ensuring that the cavity 370 is sealed.

In these embodiments, the build material escapement assembly 300 may further include a plurality of connectors 372, which may be releasably coupled to a plurality of ports 362 positioned on the base 360, as is most clearly depicted in FIG. 5. In these embodiments, the plurality of connectors 372, such as gas and/or electrical connectors, may be used to provide positive and/or negative pressure relative to the environment surrounding the build material escapement assembly 300 to the cavity 370. As the pressure within the cavity 370 increases and/or decreases, the top plate 320 of the build material escapement assembly 300 may actuate between an extended position and a retracted position.

For example, when positive pressure (e.g., relative to the environment surrounding the build material escapement assembly 300) is applied within the cavity 370, the force of the pressure may cause the retractable plate 350 to move upwards towards the retaining plate 310 (e.g., in the +Z direction as depicted by the coordinate axis of FIG. 6). As the retractable plate 350 moves upward, the retractable plate 350 may apply an upward force on the diaphragm 330, which in turn pushes the top plate 320 upward towards the retaining plate 310. Once the top plate 320 has been aligned with the retaining plate 310, the top plate 320 may be considered to be in the extended position. In these embodiments, the diaphragm 330 may be a rubber diaphragm, or any other suitably deformable diaphragm.

As most clearly depicted in FIG. 6, the support frame 340 may act as a stop for the retractable plate 350 when positive pressure is applied to the cavity 370. As illustrated in FIG. 6, the support frame 340 may include side portions 342 which extend inwardly toward a center of the cavity 370 in which the retractable plate 350 is received, such that the side portions 342 overhang the retractable plate 350. As a result, when the retractable plate 350 is forced to move upwardly by a positive pressure provided within the cavity 370, the retractable plate 350 may be stopped upon contacting the side portions 342 of the support frame 340. In these embodiments, it should be understood that the location at which the retractable plate 350 contacts the side portions 342 of the support frame 340 may correspond with the extended position of the top plate 320. The side portions 342 of the support frame 340 may further ensure that the top plate 320 is not extended above the retaining plate 310.

In contrast, when negative pressure (e.g., relative to the environment surrounding the build material escapement assembly 300), i.e., a vacuum, is drawn within the cavity 370, the retractable plate 350 may move downwardly towards the base 360 of the build material escapement assembly 300 (e.g., in the –Z direction depicted by the coordinate axis of FIG. 6). In these embodiments, as the retractable plate 350 moves downwardly, the retractable plate 350 being coupled to the diaphragm 330 draws the diaphragm 330 similarly downward. Consequently, the force applied by the diaphragm 330 on the top plate 320 may be relieved, which may cause the top plate 320, also coupled to the diaphragm 330 and the retractable plate 350 to move downwardly to the retracted position. In these embodiments, the top plate 320 may be actuated a distance between 1 mm and 20 mm, and more particularly, a distance between 5 mm and 12 mm, and even more particularly a distance of 9 mm, when moving between the extended position and the retracted position.

Referring still to FIGS. 5 and 6, in the retracted position, the top plate 320 may be offset from the retaining plate 310, such that the top plate 320 is positioned beneath the retaining plate 310 (e.g., in the –Z direction as depicted by the coordinate axis of FIG. 6). In the retracted position, excess build material 31 may be pushed from the build area 124 onto the top plate 320, such that the excess build material 31 is positioned below (e.g., in the –Z direction as depicted by the coordinate axis of FIG. 6) the retaining plate 310. By positioning the excess build material 31 beneath the retaining plate 310, the recoat assembly 200 may move past the build material escapement assembly 300 during the forward stroke without disrupting or distributing the excess build material 31 outside of the build area 124.

As shown most clearly in FIG. 5, the build material escapement assembly 300 may further include a cover 302, which may be disposed on the retaining plate 310 and operable to protect the plurality of connectors 372. For example, the plurality of connectors 372 may each include a bulk head that extends through the retaining plate 310. The cover 302 may ensure that the excess build material 31 pushed onto the build material escapement assembly 300 does not fall into the plurality of connectors 372.

Once the recoat assembly 200 has moved beyond the build material escapement assembly 300, the top plate 320 may be actuated to the extended position. In the extended position, the top plate 320 may lie flush with the retaining plate 310, such that the excess build material 31 is presented to the recoat assembly 200. In these embodiments, when the recoat assembly 200 begins the return recoat (e.g., in the +X direction as depicted by the coordinate axis of FIG. 6), the rollers 202, 204 of the recoat assembly 200 will distribute the excess build material 31 across the build platform 120.

Referring again to FIGS. 5 and 6, the plurality of connectors 372 may further include a plurality of sensors 374. In these embodiments, the plurality of sensors 374 may be used to determine whether the top plate 320 is in the extended or retracted position. To determine the position of the top plate 320, the plurality of sensors 374 may monitor the retractable plate 350. For example, when the retractable plate 350 is elevated relative to a neutral position within the cavity 370, the sensors 374 may determine that the top plate 320 is in the extended position. In contrast, when the retractable plate 350 is positioned below the neutral position, the sensors 374 may determine that the top plate 320 is in the retracted position.

It should be noted that monitoring the position of the top plate 320 may be of significance for a variety of reasons. For example, a user may be able to determine if a mechanical failure has occurred within the build material escapement assembly 300 by monitoring the position of the top plate 320 relative the retaining plate 310. Furthermore, this may allow a user to ensure that build material 31 is not presented when unintended, such as when the print head 150 is disposing binder material 50 on the build platform 120.

Figure 7:
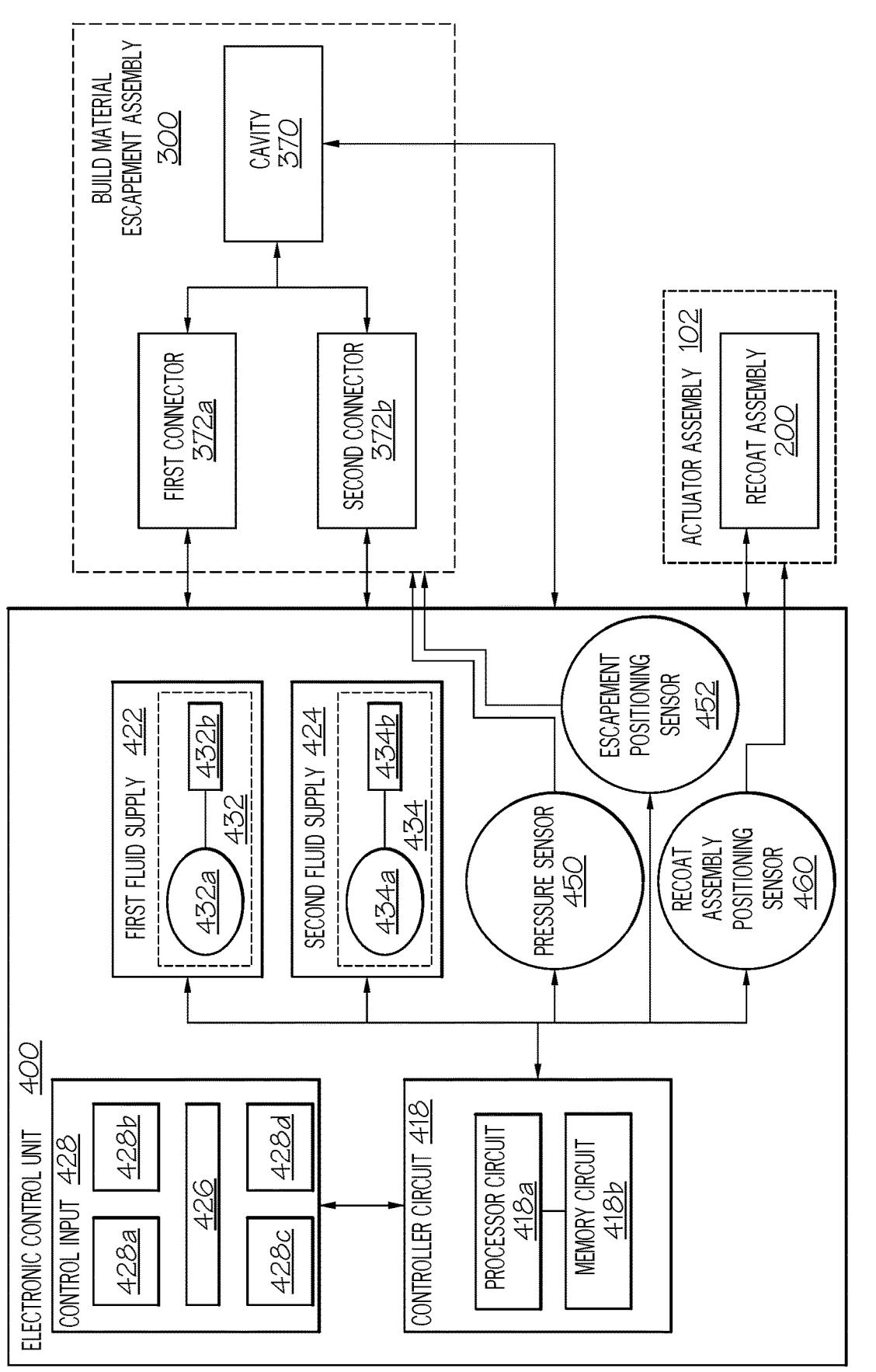
FIG. 7 schematically depicts an electronic control unit for controlling the build material escapement assembly of FIG. 5, according to one or more embodiments shown and described herein.

Referring now to FIG. 7, operation of the build material escapement assembly 300 with reference to FIGS. 5 and 6 may be further controlled via an electronic control unit 400, as is depicted in FIG. 7. In these embodiments, the electronic control unit 400 may independently control a plurality of fluid supplies sources (e.g., air supplies), such as a first fluid supply source 422 and a second fluid supply source 424 that are fluidly coupled to the plurality of connectors 372, such as first connector 372a and second connector 372b, based on the positioning of the recoat assembly 200 along the actuator assembly 102.

Referring still to FIG. 7, the electronic control unit 400 may include a controller circuit 418, the first fluid supply source 422, the second fluid supply source 424, a pressure sensor 450, an escapement positioning sensor 452, and a recoat assembly positioning sensor 460. The electronic control unit 400 may further include a control input 428, such as a computer, which may allow a user to operate the electronic control unit 400. In these embodiments, the control input 428 may have a battery 426, and may provide automatic control of the electronic control unit 400 via a software program, or may be manually controlled via a user manipulating a user interface thereof.

The control input 428 may include control buttons and visual/aural indicators, such as displays and/or speakers, with the control buttons providing various functions over the electronic control unit 400, and with the visual/aural indicators providing visual/aural feedback to the status of one or more conditions and/or positions of components of the electronic control unit 400. In these embodiments, the control buttons may include one or more buttons 428a, 428b and/or one or more knobs 428c, 428d for activating the fluid supply sources 422, 424.

Referring still to FIG. 7, the controller circuit 418 may be electrically and communicatively coupled to the first fluid supply source 422, the second fluid supply source 424, the pressure sensor 450, the escapement positioning sensor 452, the recoat assembly positioning sensor 460 and the control input 428, such as by one or more wires or circuit traces. In these embodiments, the controller circuit 418 may be assembled on an electrical circuit, and may include, for example, a processor circuit 418a and a memory circuit 418b.

The processor circuit 418a may have one or more programmable microprocessors and associated circuitry, such as an input/output interface, buffers, memory, etc. Memory circuit 418b may communicatively coupled to processor circuit 418a, e.g., via a bus circuit, and may be a non-transitory electronic memory that may include volatile memory circuits, such as random access memory (RAM), and non-volatile memory circuits, such as read only memory (ROM), electronically erasable programmable ROM (EE-PROM), flash memory, etc. Controller circuit 418 may be formed as one or more Application Specific Integrated Circuits (ASIC).

Controller circuit 418 may be configured via software and/or firmware residing in memory circuit 418b to execute program instructions to perform functions associated with the activation of the first and/or second fluid supply sources 422, 424.

Referring again to FIG. 7, the first fluid supply source 422 may include a first fluid supply module 432. In these embodiments, the first fluid supply module 432 may be electrically and controllably coupled to the controller circuit 418. As provided herein, the first fluid supply module 432 may be electrically and controllably coupled to the controller circuit 418 by way of electrical wiring or any other suitable electrical connections, such that user inputs on the control input 428 may be relayed to the controller circuit 418 and used to control the fluid delivered by the first fluid supply module 432 to the first connector 372a. In these embodiments, the first fluid supply source 422 may include a power source 432a, such as an electric motor, to which an electric lead 432b is attached.

Similarly, the second fluid supply source 424 may include a second fluid supply module 434. The second fluid supply module 434 may be electrically and controllably coupled to the controller circuit 418 by way of electrical wiring or any other suitable electrical connections, such that user inputs on the control input 428 may be relayed to the controller circuit 418 and used to control the fluid delivered by the second fluid supply module 434 to the second connector 372b. In these embodiments, the second fluid supply module 434 may include a power source 434a, such as an electric motor, to which an electric lead 434b is attached.

Referring still to FIG. 7, the pressure sensor 450, the escapement positioning sensor 452, and the recoat assembly positioning sensor 460 may be similarly coupled to the controller circuit 418 by way of electrical wiring or any other suitable connections. In these embodiments, the pressure sensor 450 may be further coupled to the cavity 370, such that the pressure values recorded by the pressure sensor 450 may be conveyed to a user via a user interface of the electronic control unit 400. In response to pressure values recorded by the pressure sensor 450, the user may utilize the electronic control unit 400 to supply additional fluid to the cavity 370 via the first fluid supply source 422 or remove fluid from the cavity 370 via the second fluid supply source 424, such that a desired pressure is achieved within the cavity 370. As should be understood in view of the foregoing, the pressure within the cavity 370 may correspond to the position of the top plate 320 of the build material escapement assembly 300.

In these embodiments, the pressure fluctuation within the cavity 370 may cause the build material escapement assembly 300 to move between the extended position and the retracted position, as has been described herein. Accordingly, the escapement positioning sensor 452 may monitor the position of the build material escapement assembly 300, such that the position (e.g., in the +/−Z direction) of the build material escapement assembly 300 may be conveyed to a user via a user interface of the electronic control unit 400. In response to the position of the build material escapement assembly 300, the user may utilize the electronic control unit 400 to supply additional fluid to the cavity 370 via the first fluid supply source 422 or remove fluid from the cavity 370 via the second fluid supply source, such that a desired position of the build material escapement assembly 300 is achieved.

Referring still to FIG. 7, the recoat assembly positioning sensor 460 may be further connected to the actuator assembly 102, such that the position (e.g., the lateral position in the +/−X direction) of the recoat assembly 200 recorded by the recoat assembly positioning sensor 460 may be conveyed to a user via a user interface of the electronic control unit 400. In response to the position of the recoat assembly 200, a user may utilize the electronic control unit 400 to supply additional fluid to the cavity 370 via the first fluid supply source 422 or remove fluid from the cavity 370 via the second fluid supply source 424, such that the top plate 320 of the build material escapement assembly 300 remains in a desired position (e.g., either the extended position or the retracted position). For example, when the recoat assembly 200 is performing a forward recoat, it may be desirable to have the build material escapement assembly 300 in the retracted position. In contrast, the build material escapement assembly 300 may be moved to the extended position prior to the recoat assembly 200 performing the return recoat, as has been described in detail herein.

Figure 8:
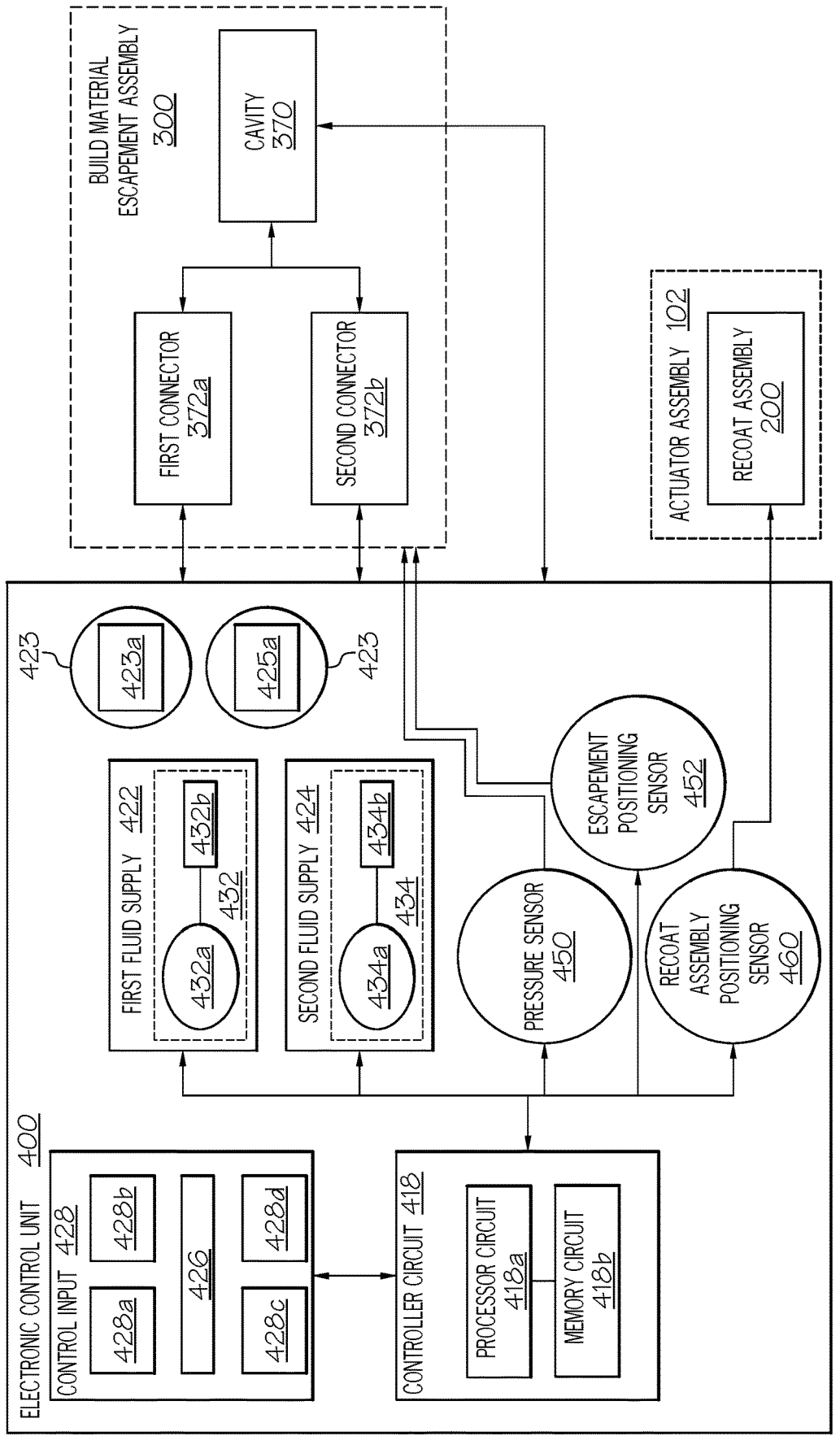
FIG. 8 schematically depicts an illustrative embodiment of an electronic control unit for controlling the build material escapement assembly of FIG. 5, according to one or more embodiments shown and described herein.

Turning now to FIG. 8, in some embodiments, the electronic control unit 400 may be configured to rapidly move the build material escapement 300 between the extended position and the retracted position. For example, in some instances, the build material escapement assembly 300 may be utilized in connection with a rapid-movement recoat assembly 200 configured to complete fast-layer print speeds.

In these embodiments, the electronic control unit 400 may further include a plurality of pressurized cylinders, such as fluid cylinders, that may be used to rapidly move the build material escapement assembly 300 between the extended position and the retracted position. For example, as depicted in FIG. 8, the plurality of pressurized cylinders may include an extension cylinder 423 and a retraction cylinder 425, where the extension cylinder 423 is positively pressurized to a first predetermined pressure and the retraction cylinder 425 is negatively pressurized to a second predetermined pressure. In some embodiments, the first predetermined pressure may be opposite the second predetermined pressure.

Referring still to FIG. 8, the extension cylinder 423 and the retraction cylinder 425 may be electrically and controllably coupled to the controller circuit 418 by way of electrical wiring or any other suitable electrical connections, such that user inputs on the control input 428 may be relayed to the controller circuit 418 and used to control the fluid delivered by the extension cylinder 423 and/or retraction cylinder 425 to the build material escapement assembly 300.

In these embodiments, the extension cylinder 423 may further include a valve 423a, that may be operable via the electronic control unit 400 to release pressurized fluid into the build material escapement assembly 300. For example, to move the build material escapement assembly 300 to the extended position, the valve 423a may be moved from a closed position to an open position, such that the pre-calibrated pressurized fluid contained within the extension cylinder 423 is released into the build material escapement assembly 300. Because the pressurized fluid within the extension cylinder is pre-calibrated to a desired pressure, the release of the fluid into the build material escapement assembly 300 may cause the build material escapement assembly to rapidly move to the extended position. In these embodiments, once fluid has been released from the extension cylinder 423 to the build material escapement assembly 300, the extension cylinder 423 and the build material escapement assembly 300 may be in equilibrium pressure.

Referring still to FIG. 8, the electronic control unit 400 may similarly be used to cause the build material escapement assembly 300 to rapidly move from the extended position to the retracted position. In these embodiments, the retraction cylinder 425 may further include a valve 425a, that may be operable via the electronic control unit 400 to allow fluid from the build material escapement assembly 300 to be released into the retraction cylinder 425. For example, to move the build material escapement assembly 300 to the retracted position, the valve 425a may be moved from a closed position to an open position, such that the pressurized fluid contained within the build material escapement assembly 300 may be discharged into the retraction cylinder 425. Because the retraction cylinder 425 is pre-calibrated to a desired pressure, the release of the fluid from the build material escapement assembly 300 into the retraction cylinder 425 may cause the pressure within the build material escapement cylinder 300 to drop below an environmental pressure, thereby resulting in the build material escapement cylinder 300 rapidly moving to the retracted position In these embodiments, the retraction cylinder 425 may also take the form of a pump, such as a venturi pump, or any similar mechanism capable of rapidly evacuating fluid from the build material escapement assembly 300.

In these embodiments, as the build material escapement assembly 300 is rapidly moved to the retracted position, the extension cylinder 423 may be simultaneously pressurized using an external fluid supply source (e.g., fluid supply source 422) such that the extension cylinder 423 is calibrated for a subsequent rapid movement of the build material escapement assembly 300 from the retracted position to the extended position. The extension cylinder 423 and the retraction cylinder 425 may be continually calibrated to move the build material escapement assembly 300 between the extended position and the retracted position until the recoat assembly 200 has completed a printing process.

Turning now to FIG. 9, an illustrative flow diagram of a method 900 for managing build material 31 during an additive manufacturing process is depicted with reference to FIGS. 1-6. As depicted, the method 900 may initially involve providing an additive manufacturing system 100, as is depicted at block 910. In these embodiments, the additive manufacturing system 100 may include a recoat assembly 200 having a base member 250 movable in a first lateral direction and a second lateral direction opposite the first lateral direction, and a build material 31 spreading member coupled to the base member 250, 250 the build material 31 spreading member including a first roller 202 and a second roller 204, as has been described herein. Furthermore, the additive manufacturing system 100 may include a build material escapement assembly 300 that may be operable to collect excess build material 31 that accumulates during an additive manufacturing process.

In these embodiments, the additive manufacturing system 100 may further include a supply platform 130 for supplying build material 31 to the recoat assembly 200 and a build area 124 that receives the build material 31 distributed by the recoat assembly 200. Referring still to FIG. 9 at block 910, when the base member 250 of the recoat assembly 200 moves in the first lateral direction, the recoat assembly 200 may move from an initial position towards the build material escapement assembly 300. As the base member 250 moves in the first lateral direction, the recoat assembly 200 may complete a forward stroke, during which the recoat assembly 200 may push build material 31 from the supply platform 130 and to the build area 124. As the recoat assembly 200 finishes the forward stroke, any excess build material 31 which has not been evenly distributed on the build area 124 may be pushed into the build material escapement assembly 300.

Referring still to FIG. 9, in order to receive the excess build material 31, the method 900 may further involve positioning a top plate 320 of the build material escapement assembly 300 in a retracted position, as shown at block 920. In these embodiments, the top plate 320 of the build material escapement assembly 300 may be offset from a retaining plate 310 which couples the build material escapement assembly 300 to the additive manufacturing system 100. Thus, when the recoat assembly 200 moves in the first lateral direction, the excess build material 31 that may accumulate on the build area 124 may be received within the space created between the top plate 320 and the retaining plate 310 by moving the top plate 320 to the retracted position.

Referring again to FIG. 9, the method 900 may further involve positioning the top plate 320 of the build material escapement assembly 300 in an extended position when the base member 250 is moving in the second lateral direction, as is depicted at block 930. When the base member 250 of the recoat assembly 200 moves in the second lateral direction, the recoat assembly 200 may move from a position beyond the build material escapement assembly 300 towards the initial position. In these embodiments, as the base member 250 moves in the second lateral direction, the recoat assembly 200 may complete a return stroke, during which the recoat assembly 200 may push build material 31 from the build material escapement assembly 300 and on to the build area 124. Thus, as the recoat assembly 200 begins the return stroke, the top plate 320 of the build material escapement assembly 300 may be moved to the extended position, such that the excess build material 31 collected by the build material escapement assembly 300 during the forward stroke is presented to the recoat assembly 200 and may be distributed back on to the build area 124.

From the above, it is to be appreciated that defined herein are build material escapement assemblies for an additive manufacturing system. Further aspects of the embodiments described herein are provided by the subject matter of the following clauses:

Clause 1. A build material escapement assembly for an additive manufacturing system, the build material escapement assembly comprising: a retaining plate for coupling the build material escapement assembly to the additive manufacturing system; a base having a plurality of ports, the base being disposed beneath the retaining plate; a support frame disposed within the base; a diaphragm disposed around the base, the diaphragm being coupled to the base; a retractable plate disposed between the support frame and the diaphragm; a top plate coupled to the retractable plate through the diaphragm; and a plurality of connectors coupled to the plurality of ports of the base; wherein the base, the support frame, the diaphragm, the retractable plate, and the top plate define a cavity, and the top plate is movable between a retracted position by applying negative pressure to the cavity and an extended position by applying positive pressure to the cavity via the plurality of connectors.

Clause 2. The build material escapement assembly of clause 1, wherein the top plate is movable between the extended position and the retracted position by applying negative pressure to the cavity via the plurality of connectors.

Clause 3. The build material escapement assembly of clause 1, wherein the top plate is offset from the retaining plate such that the top plate is positioned beneath the retaining plate in the retracted position.

Clause 4. The build material escapement assembly of clause 1, wherein the top plate lies flush with the retaining plate in the extended position.

Clause 5. The build material escapement assembly of clause 1, wherein the support frame further includes side portions which overhang the retractable plate, such that the retractable plate contacts the side portions when the top plate is in the extended position.

Clause 6. The build material escapement assembly of clause 1, wherein the top plate moves a predetermined distance from the retracted position to the extended position.

Clause 7. The build material escapement assembly of clause 1, further including a cover for covering the plurality of connectors.

Clause 8. The build material escapement assembly of clause 1, further including a plurality of sensors configured to monitor when the top plate is in the retracted position or the extended position.

Clause 9. The build material escapement assembly of clause 1, further including an electronic control unit for controlling a plurality of fluid supply sources that supply fluid to the plurality of connectors to control pressure within the cavity.

Clause 10. An additive manufacturing system comprising: a supply platform for supplying build material to the additive manufacturing system; a build area for receiving the build material; a recoat assembly comprising: a base member movable in a first lateral direction and a second lateral direction opposite the first lateral direction; a build material spreading member coupled to the base member; and a build material escapement assembly comprising: a retaining plate for coupling the build material escapement assembly to the additive manufacturing system; a base having a plurality of ports, the base being disposed beneath the retaining plate; a diaphragm disposed around an outer perimeter of the base, the diaphragm being coupled to the base; a retractable plate disposed between the support frame and the diaphragm; a top plate coupled to the retractable plate through the diaphragm; and a plurality of connectors coupled to the plurality of ports of the base; wherein the base, the diaphragm, the retractable plate, and the top plate define a cavity, and the top plate is movable between a retracted position by applying negative pressure to the cavity and an extended position by applying positive pressure to the cavity via the plurality of connectors.

Clause 11. The additive manufacturing system of clause 10, wherein the recoat assembly pushes the build material from the build area and into the build material escapement assembly when the recoat assembly moves in the first lateral direction.

Clause 12. The additive manufacturing system of clause 11, wherein the top plate of the build material escapement assembly is moved to the retracted position when the recoat assembly moves in the first lateral direction.

Clause 13. The additive manufacturing system of clause 10, wherein the recoat assembly pushes the build material from the top plate of the build material escapement assembly and onto the build area when the recoat assembly moves in the second lateral direction.

Clause 14. The additive manufacturing system of clause 11, wherein the top plate of the build material escapement assembly is moved to the extended position when the recoat assembly moves in the second lateral direction.

Clause 15. The additive manufacturing system of clause 10, further including a positioning sensor for monitoring a position of the recoat assembly relative the build material escapement assembly.

Clause 16. The additive manufacturing system of clause 10, wherein the top plate of the build material escapement assembly is offset from the retaining plate such that the top plate is positioned beneath the retaining plate in the retracted position.

Clause 17. The build material escapement assembly of clause 10, wherein the top plate of the build material escapement assembly lies flush with the retaining plate in the extended position.

Clause 18. A method of managing build material in an additive manufacturing process comprising: providing an additive manufacturing system comprising: a recoat assembly comprising: a base member movable in a first lateral direction and a second lateral direction opposite the first lateral direction; a build material spreading member coupled to the base member, the build material spreading member including a first roller and a second roller; and a build material escapement assembly; positioning a top plate of the build material escapement assembly in a retracted position at the base member is moving in the first lateral direction; and positioning the top plate of the build material escapement assembly in an extended position at the base member is moving in the second lateral direction.

Clause 19. The method of clause 18, wherein the build material escapement assembly further includes a retaining plate for coupling the build material escapement assembly to the additive manufacturing system, a base disposed beneath the retaining plate, a support frame disposed within the base, a diaphragm disposed around an outer perimeter of the base, and a retractable plate disposed between the support frame and the diaphragm, and wherein the base, the support frame, the diaphragm, and the retractable plate define a cavity.

Clause 20. The method of clause 19, wherein positioning the top plate of the build material escapement assembly in the retracted position involves applying a negative pressure to the cavity of the build material escapement assembly, and positioning the top plate of the build material escapement assembly in the extended position involves applying a positive pressure to the cavity of the build material escapement assembly.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A build material escapement assembly for an additive manufacturing system, the build material escapement assembly comprising:
a retaining plate for coupling the build material escapement assembly to the additive manufacturing system;
a base having a plurality of ports, the base being disposed beneath the retaining plate;
a support frame disposed within the base;
a diaphragm disposed around the base, the diaphragm being coupled to the base;
a retractable plate disposed between the support frame and the diaphragm;
a top plate coupled to the retractable plate through the diaphragm; and
a plurality of connectors coupled to the plurality of ports of the base;
wherein the base, the support frame, the diaphragm, the retractable plate, and the top plate define a cavity, and the top plate is movable between a retracted position by applying negative pressure to the cavity and an extended position by applying positive pressure to the cavity via the plurality of connectors.

2. The build material escapement assembly of claim 1, wherein the top plate is movable between the extended position and the retracted position by applying negative pressure to the cavity via the plurality of connectors.

3. The build material escapement assembly of claim 1, wherein the top plate is offset from the retaining plate such that the top plate is positioned beneath the retaining plate in the retracted position.

4. The build material escapement assembly of claim 1, wherein the top plate lies flush with the retaining plate in the extended position.

5. The build material escapement assembly of claim 1, wherein the support frame further includes side portions which overhang the retractable plate, such that the retractable plate contacts the side portions when the top plate is in the extended position.

6. The build material escapement assembly of claim 1, wherein the top plate moves a predetermined distance between from the retracted position to the extended position.

7. The build material escapement assembly of claim 1, further including a cover for covering the plurality of connectors.

8. The build material escapement assembly of claim 1, further including a plurality of sensors configured to monitor when the top plate is in the retracted position or the extended position.

9. The build material escapement assembly of claim 1, further including an electronic control unit for controlling a plurality of fluid supply sources that supply fluid to the plurality of connectors to control pressure within the cavity.

10. An additive manufacturing system comprising:
a supply platform for supplying build material to the additive manufacturing system;
a build area for receiving the build material;

a recoat assembly comprising:

a base member movable in a first lateral direction and a second lateral direction opposite the first lateral direction;

a build material spreading member coupled to the base member; and a build material escapement assembly comprising:

a retaining plate for coupling the build material escapement assembly to the additive manufacturing system;

a base having a plurality of ports, the base being disposed beneath the retaining plate;

a diaphragm disposed around an outer perimeter of the base, the diaphragm being coupled to the base;

a retractable plate disposed below the diaphragm;

a top plate coupled to the retractable plate through the diaphragm; and a plurality of connectors coupled to the plurality of ports of the base;

wherein the base, the diaphragm, the retractable plate, and the top plate define a cavity, and the top plate is movable between a retracted position by applying negative pressure to the cavity and an extended position by applying positive pressure to the cavity via the plurality of connectors.

11. The additive manufacturing system of claim 10, wherein the recoat assembly pushes the build material from the build area and into the build material escapement assembly when the recoat assembly moves in the first lateral direction.

12. The additive manufacturing system of claim 11, wherein the top plate of the build material escapement assembly is moved to the retracted position when the recoat assembly moves in the first lateral direction.

13. The additive manufacturing system of claim 10, wherein the recoat assembly pushes the build material from the top plate of the build material escapement assembly and onto the build area when the recoat assembly moves in the second lateral direction.

14. The additive manufacturing system of claim 11, wherein the top plate of the build material escapement assembly is moved to the extended position when the recoat assembly moves in the second lateral direction.

15. The additive manufacturing system of claim 10, further including a positioning sensor for monitoring a position of the recoat assembly relative the build material escapement assembly.

16. The additive manufacturing system of claim 10, wherein the top plate of the build material escapement assembly is offset from the retaining plate such that the top plate is positioned beneath the retaining plate in the retracted position.

17. The build material escapement assembly of claim 10, wherein the top plate of the build material escapement assembly lies flush with the retaining plate in the extended position.

* * * * *